(12) United States Patent
Moerk et al.

(10) Patent No.: US 10,387,498 B2
(45) Date of Patent: Aug. 20, 2019

(54) POLYMORPHIC CONFIGURATION MANAGEMENT FOR SHARED AUTHORIZATION OR AUTHENTICATION PROTOCOLS

(71) Applicant: CA, Inc., Islandia, NY (US)

(72) Inventors: Michael Moerk, Islandia, NY (US);
Joanne Pelkey, Islandia, NY (US);
Doreen Collins, Islandia, NY (US);
William Pollard, Islandia, NY (US);
Vinay Jha, Islandia, NY (US)

(73) Assignee: CA, Inc., Islandia, NY (US)

(*) Notice: Subject to any disclaimer, the term of this patent is extended or adjusted under 35 U.S.C. 154(b) by 111 days.

(21) Appl. No.: 15/433,275

(22) Filed: Feb. 15, 2017

(65) Prior Publication Data
US 2018/0234416 A1 Aug. 16, 2018

(51) Int. Cl.
*H04L 29/06* (2006.01)
*H04L 12/24* (2006.01)
*G06F 16/901* (2019.01)

(52) U.S. Cl.
CPC .......... *G06F 16/9024* (2019.01); *H04L 63/08* (2013.01)

(58) Field of Classification Search
CPC ..... H04L 63/0876; H04L 41/08; H04L 63/08; G06F 17/30958; G06F 16/9024
See application file for complete search history.

(56) References Cited

U.S. PATENT DOCUMENTS

| | | | |
|---|---|---|---|
| 8,982,129 B1* | 3/2015 | Broekhuijsen | G06F 17/30961 345/440 |
| 2016/0261727 A1* | 9/2016 | Yang | H04L 65/4084 |
| 2016/0337338 A1 | 11/2016 | Burch et al. | |
| 2016/0337346 A1 | 11/2016 | Momchilov et al. | |
| 2016/0337351 A1 | 11/2016 | Spencer et al. | |
| 2016/0366121 A1* | 12/2016 | Rykowski | H04L 63/0815 |
| 2017/0006021 A1 | 1/2017 | Karaatanassov et al. | |
| 2017/0026374 A1 | 1/2017 | Oberheide et al. | |
| 2017/0034172 A1 | 2/2017 | Biggs et al. | |
| 2017/0041308 A1 | 2/2017 | Kavantzas et al. | |

OTHER PUBLICATIONS

Configuring Single Sign-On using SAML in WebLogic Server 9.2, http://www.oracle.com/technetwork/articles/idm/sso-with-saml-099684.html, Jan. 4, 2017, pp. 1 to 2.
(Continued)

*Primary Examiner* — Meng Li
(74) *Attorney, Agent, or Firm* — Pillsbury Winthrop Shaw Pittman LLP

(57) ABSTRACT

Provided is a process including: receiving, from a first service-provider computer system, via a network, with an identity-provider computer system, a request to authenticate a user computing device; forming, with the identity-provider computer system, a first reply-configuration specification from a first plurality of configuration components; determining, with the identity-provider computer system, whether to provide authentication; forming, with the identity-provider computer system, based on the first reply-configuration specification, a reply to the request, the reply including a result of the authentication determination; and sending, with the identity-provider computer system, the reply.

20 Claims, 5 Drawing Sheets

(56) References Cited

OTHER PUBLICATIONS

Dynamic Dispatch, Wikipedia, https://en.wikipedia.org/wiki/Dynamic_dispatch, Jan. 12, 2017, pp. 1 to 4.
SAML 2.0 Web Browser Single-Sign-On, http://www.ibm.com/support/knowledgecenter/SSEQTP_8.5.5/com.ibm.websphere.wlp.doc/ae/cwlp_saml_web_sso.html, Dec. 15, 2016, pp. 1 to 3.
The Java Tutorials: Learning the Java Language, Interfaces and Inheritance, http://web.archive.org/web/20170204075542/https://docs.oracle.com/javase/tutorial/java/landl/subclasses.html, Jan. 21, 2017, pp. 1 to 4.
Late Binding, Wikipedia, https://en.wikipedia.orglwiki/Late_binding, Jan. 2, 2017, pp. 1 to 4.
OAuth, Wikipedia, https://en.wikipedia.org/wiki/OAuth, Jan. 9, 2017, pp. 1 to 6.
OpenID, Wikipedia, https://en.wikipedia.org/wiki/OpenID, Jan. 6, 2017, pp. 1 to 11.
OpenID Connect, Wikipedia, https://en.wikipedia.org/wiki/OpenID_Connect, Dec. 2, 2016, pp. 1 to 2.
Polymorphism (computer science), Wikipedia, https://en.wikipedia.org/wiki/Polymorphism_(computer_science), Jan. 5, 2017, pp. 1 to 5.
SAML 2.0, Wikipedia, https://en.wikipedia.org/wiki/SAML_2.0, Jan. 12, 2017, pp. 1 to 17.
SAML Configuration, https://web-beta.archive.org/web/20161006234344/http://www.componentspace.com/Forums/37/SAML-Configuration, Oct. 6, 2016, pp. 1 to 7.
Bindings for the OASIS Security Assertion Markup Language (SAML) V2.0, http://docs.oasis-open.org/security/saml/v2.0/, Mar. 15, 2005, pp. 1 to 46.
Assertions and Protocols for the OASIS Security Assertion Markup Language (SAML) V2.0, http://docs.oasis-open.org/security/saml/v2.0/, Mar. 15, 2005, pp. 1 to 86.
Using of private attributes (with double underscore) #137, https://github.com/onelogin/python-saml/issues/137, May 17, 2016, pp. 1 to 3.
SAML 1.x Protocol Classes, https://docs.oracle.com/cd/E19575-01/820-3739/com/sun/identity/saml/protocol/package-summary.html, Apr. 6, 2017, pp. 1 to 1.

* cited by examiner

POLYMORPHIC CONFIGURATION MANAGEMENT FOR SHARED AUTHORIZATION OR AUTHENTICATION PROTOCOLS

BACKGROUND

1. Field

The present disclosure relates generally to computer security and, more specifically, to polymorphic configuration management for shared authorization or authentication protocols.

2. Description of the Related Art

Recently, many software applications have migrated to the cloud. Often, user-facing and back-end software applications execute on remote computer systems hosted by various parties. Examples include productivity suites, calendaring applications, email, document management platforms, enterprise resource planning applications, project management applications, and various databases. When attempting to use these applications, before being granted access, users are often authenticated or otherwise authorized by the computer system to determine that the person seeking access is authorized to do so.

SUMMARY

The following is a non-exhaustive listing of some aspects of the present techniques. These and other aspects are described in the following disclosure.

Some aspects include a process including: receiving, from a first service-provider computer system, via a network, with an identity-provider computer system, a request to authorize a user computing device, wherein: the request specifies a first service provider among a plurality of different service providers on a plurality of different domains for which the identity-provider computer system is configured to make authorization determinations, and the request is received after the user computing device requests access from the first service-provider computer system; forming, with the identity-provider computer system, a first reply-configuration specification from a first plurality of configuration components, wherein forming comprises: accessing a graph of configuration components, the graph defining reply-configuration specifications for the plurality of different service providers, the first plurality of configuration components corresponding to a subset of the graph, determining that at least some of the first plurality of configuration components pertain to the first service-provider computer system based on a path in the graph along edges of the graph, and evaluating a relationship defined by an edge of the graph to determine, at least in part, how to combine a pair of configuration components linked by the edge into at least part of the first reply-configuration specification, wherein: at least some of the first plurality of configuration components pertain to service providers among the plurality of different service providers other than the first service provider, and the first reply-configuration specification specifies at least part of a message to communicate an authorization determination to the first service-provider computer system; determining, with the identity-provider computer system, whether to provide authorization; forming, with the identity-provider computer system, based on the first reply-configuration specification, a reply to the request, the reply including a result of the authorization determination; and sending, with the identity-provider computer system, the reply.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
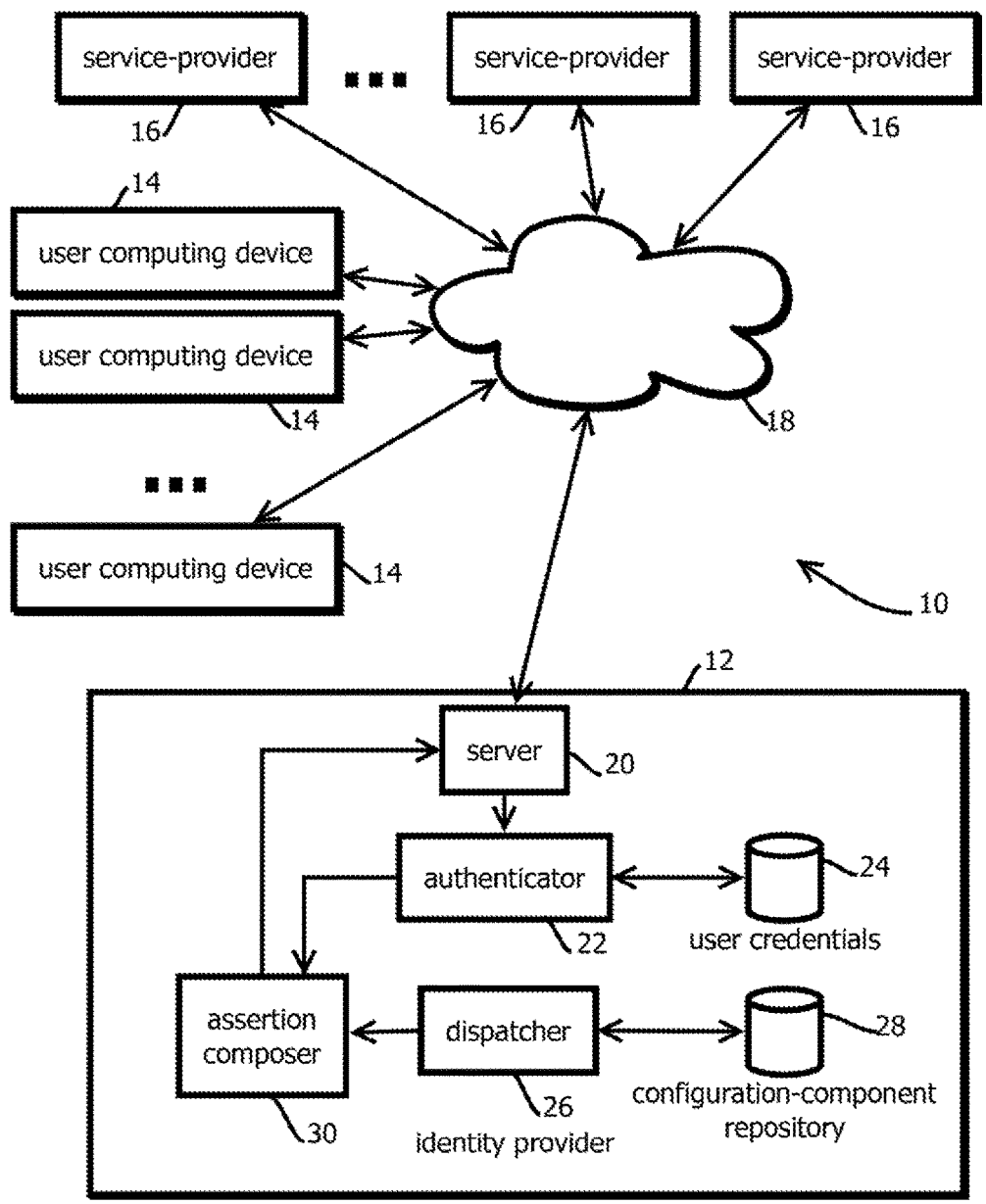
FIG. 1 is a block diagram of a computing environment including an identity-provider computer system in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cyber security. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Securing user-facing distributed computing applications is a persistent challenge. Often, these distributed applications have a client-server architecture in which users interface with a client computing device to access computing resources via the server over a network. Often, the network is an untrusted network, such as the Internet or in some cases an intranet, placing the client computing devices relatively remote from the server. As a result, it can be difficult to determine whether attempts to access resources via the server should be authorized or are unauthorized malicious requests.

To determine whether requests are authorized, a variety of different approaches are often used. In many cases, users are asked to supply one or more credentials, such as a username and password, with the latter often being a relatively high entropy string known to an authorized user and difficult for others to guess. Often, multifactor authentication or authorization protocols supplement passwords with other signals that are difficult for an attacker to impersonate, for instance, demonstrating possession of a computing device configured to generate a cryptographic key or demonstrating possession of a cell phone that receives a text message with a pin code.

Certain authorization approaches present challenges when used in the context of web browsers and other client-side applications used to access potentially untrusted resources, like public websites and certain application program interfaces accessed by some native applications. Often, these client-site applications implement a security model that constrains the client-site application for security purposes, for instance, by limiting access to certain areas of client memory and preventing resources from one domain from accessing resources from another domain via the client computing device. For instance, many web browsers implement a same origin policy that prevents a malicious website from reading a cookie set by a different website, like that of a bank storing a user's password or authenticated session credentials, or in some cases, from requesting resources from another domain. (None of which is to suggest that the present techniques are limited to use cases with a same origin policy.)

These security techniques often make it difficult for an authorization determination to be securely shared across multiple servers on different domains. A given server at a given domain may receive user credentials and make an authorization determination and store a result of the determination on the client computing device for reference in subsequent exchanges during a computing session (e.g., as a session cookie). But it can be difficult for a different server on a different domain to access that information or leverage the previous determination. As a result, often users are asked to engage in multiple instances of authorization sessions with the different servers, which can be burdensome to users, can increase an attack surface with multiple computing systems each having user credentials, and can consume excess bandwidth and computing resources.

Some or all of these challenges may be mitigated with a shared authorization or authentication protocol. These protocols often specify various ways for one server having made an authentication or authorization determination to communicate the result with other servers on other domains while honoring the client-side security constraints discussed above. Examples include the security assertion markup language (SAML), the lightweight directory access protocol (LDAP), OAuth (and OAuth 2.0), OpenID, OpenID connect, and Facebook™ connect. In some cases, the shared authorization authentication protocol is a single sign-on protocol by which a given determination may be used on multiple domains, for instance, with the SAML protocol, and in some cases, some of these protocols may be used in combination.

Many existing ways of implementing shared authorization or authentication protocols are not well suited for emerging trends in the field of computer science. Increasing numbers of companies are increasing relying on cloud-hosted software as a service (SaaS) applications provided by diverse arrays of third parties (which is not to suggest that the present techniques are not also useful in on-premises deployments). Often, each of these different SaaS applications implements a given shared authorization authentication protocol differently from the others, e.g., a user may interface with a dozen different SAML implementations. It is expected that many relatively large companies will have accounts with more than 10, and in many cases more than 20, or more than 50 different SaaS applications with which their users interface, often with each SaaS application (or on-premises application) implementing a shared authorization or authentication protocol differently. And identity management applications designed to help multiple companies manage this complexity may interface with more than 100 or more than 200 different SaaS applications among those used by their client the base. Complicating the challenge, in many cases the SaaS applications change their implementation of an authorization or authentication protocol over time, with multiple versions being implemented, in some cases at the same time for different users. As a result, existing techniques for specifying how to communicate an authentication or authorization determination between servers on different domains are expected to become unwieldy and unmanageable due to an explosion in complexity from these trends. A given computing system may need to manage several hundred or several thousand different specifications for how to communicate this information, and those specifications may experience changes as often as a several times a day or week among the collection.

FIG. 1 shows an example of a computing environment 10 having an identity-provider computer system 12 configured to mitigate some of these challenges and address other needs in industry described below and that will be apparent to a reader of ordinary skill in the art. In some embodiments, the identity-provider computer system 12 may break up the configuration specifications into configuration components, some of which may be reusable in multiple configuration specifications, thereby making the collection easier to reason about, modify, and implement. Further, some configuration components may have polymorphic properties by which configuration settings in those components may be inherited or overridden by other configuration components, thereby increasing the amount of reusability and enhancing many of the other benefits of reuse of configuration components.

The technique is illustrated by a brief overview of a particular example targeting the security assertion markup language protocol. Some embodiments build SAML configurations such that the code generates correct SAML assertions for any target integration. A hierarchy of SAML configurations (e.g., in JavaScript™ object notation (JSON) documents) are merged at run-time to determine the correct SAML configuration for a given SaaS application (e.g., a given version of a given application program interface (API) of a given resource of a given application of a given SaaS provider). For instance, a base class may describe common default SAML configuration parameters, and extensions (or instances, or implementations) of that base class may modify or extend upon the default parameters, in some cases through multiple levels of a hierarchy. Some embodiments include variables for substitution within some of the configuration documents. As a result, a relatively terse set of documents that are relatively easy to reason about and manage may specify behavior for authentication and authorization exchanges with a heterogeneous array of SaaS (or on-premises) shared authentication or authorization APIs.

Security assertion markup language or other shared authentication or authorization protocols, such as other single sign-on protocols suitable for use with the security constraints imposed by web browsers, may be implemented with the identity provider 12 shown in FIG. 1, e.g., in the context of the illustrated computing environment 10. In this example, the computing environment 10 may include multiple user computing devices 14, multiple service-provider computer systems 16, and a network 18 through which the various illustrated components communicate with one another. Three service-provider computer systems 16 and three user computing devices 14 are illustrated, but embodiments are consistent with, and commercial implementations are expected to include, substantially more instances of these components. For instance, the number of user computing devices may exceed 1,000, 10,000, or 100,000, and the number of service-provider computer systems 16 may exceed 20, 50, or 100.

In some embodiments, each user computing device 14 may be used by a different user to access a given one of the service-provider computer systems 16 upon being authenticated or authorized by the identity-provider computer system 12. (Or some computing devices 14 may be shared, or some users may have multiple computing devices 14.) Each of these components may include various forms of the computers described below with reference to FIG. 5. For example, the user computing devices 14 may be desktop computers, laptop computers, tablet computers, mobile phones, wearable computing devices, sets top box computing devices, or the like. In some embodiments, the service-provider computer systems 16 are cloud hosted collections of computers, for instance, in a data center, accessed through an API or a web interface (by a web browser or native application executing on a user computing device 14) and provided as a SaaS application. Or in some cases, some of the service-provider computer systems may be on premises applications. The network 18 may include the Internet or various other networks, such as local area networks, wireless area networks, cellular networks, and the like.

In some cases, before a user computing device 14 is granted access to resources or other services provided by a service-provider computer systems 16, the respective user computing device 14 may be authorized or authenticated by the identity-provider computer system 12. The service-provider computer system 16 may selectively grant access based on the authorization or authentication determination by the identity-provider computer system 12. The term "authentication" herein refers to an indication that a user is (e.g., has sufficiently demonstrated themselves to be) who they represent themselves to be, for instance, that a user accessing resources with a user identifier is able to supply a password associated with that user identifier. The term "authorization" herein refers to an indication that a user should be granted access to some resource. Generally, "authentication" serves as "authorization," so the term "authentication" is primarily used below. But it should be appreciated that such references to "authentication" are generic to "authorization," and the present techniques may be used for authorization determinations.

The terms "service provider" and "identity provider" correspond to roles in the security assertion markup language protocol and include computing systems filling those roles. But the terms as used herein are not limited to computing systems implementing this protocol and refer to other computing systems implementing corresponding roles in other shared authentication or authorization protocols, like those listed above.

In the illustrated embodiment, the identity-provider computer system 12 may be implemented on one or more computing devices, such as with a plurality of rack-mounted servers in a data center or as a single, standalone computer. In some cases, the various components described below may be replicated and separated from other components via a load balancer that allocates individual instances of tasks to different replicas of components to scale to larger use cases. Some embodiments may be configured to scale to relatively large implementations, for instance, handling more than 10, and in many commercially relevant use cases at peak usage, more than 100 authorization authentication determinations per second with a response latency of less than 500 ms, for instance less than 200 ms. Users are expected to be sensitive to changes in latency on the order of 50 ms, and some embodiments may offer relatively low latency responses relative to certain traditional approaches implemented at the described scales (which is not to suggest that slower responses are not also in accordance with some embodiments).

In some embodiments, the identity-provider computer system 12 includes a server 20, an authenticator 22, a user credential repository 24, a dispatcher 26, a configuration component repository 28, and an assertion composer 30. In some cases, these components may communicate with one another to implement a process described below with reference to FIG. 3 by operating upon a data structure described below with reference to FIG. 2, in some cases in the context of an identity management system described below with reference to FIG. 4.

In some embodiments, the server 20 may be a Web server or an API server, such as a nonblocking server, configured to listen to a port at a network address of the identity provider 12, receive via that port requests for authentication or authorization, and send via that port replies indicating the result of authorization or authentication determinations. In some embodiments, the server 20 may assign session identifiers to incoming requests and route incoming request to the authenticator 20 along with that session identifier, which may be carried through as context through an authentication session and used by the server 20 to identify a network address and port to which to send the reply, e.g., based on a session record mapping the session identifier to the address/port.

In some cases, authentication or authorization requests may be received from a service-provider computer system 16, for instance, upon a user computing device 14 requesting to access a resource or other service from that service-provider computer system 16. In some cases, the request for authentication may be received via the network 18 without passing through the user computing device 14. Or in some cases, the service-provider computer system 16 may send instructions to the user computing device 14 instructing that user computing device 14 to send a request to the identity-provider computer system 12. Similarly, in some cases, replies indicating authentication determinations may be sent to a service-provider computer system 16 without passing through a user computing device 14. Or some embodiments may send a redirect command to a user computing device 14 with a uniform resource locator (URL) of a service-provider computer system 16 that includes as a parameter a result of an authentication determination, thereby communicating the result via the user computing device 14 to the service-provider computer system 16. In some cases, where a user is not authentication, some embodiments may determine to not send a message to a service-provider computer system 16 at all.

In some cases, the request may be characterized as a service-provider initiated single-sign-on request, or in some cases, the request may be an ID provider initiated single-sing-on request. In the latter example, the identity provider 12 may not receive the request from the service provider 16. Rather, the user computing device 14 may send a request directly to the identity provider 12, asking to login to a service provider 16. The identity provider 12 may send an unsolicited response (indicating that the user is authenticated) to the service provider 16, which processes it and logs the user in even though it did not initiate the process with a request. Some embodiments support both scenarios, where the request is initiated by the service provide 16 and where the request is initiated by the user computing device 14.

In some cases, a request to authenticate a user includes a user identifier (such as one that is unique to the user among a user base of the identity-provider computer system 12), a user password, and an identifier of the service-provider computer system 16 to which the user seeks access (such as an identifier that is unique to the service-provider computer system among all service-provider computer systems supported by the identity-provider computer system 12). Some embodiments of the identity-provider computer system 12 may receive this request and perform the process of FIG. 3 described below. In some cases, a request does not include the user's password, and the user's password may be withheld from the service-provider computer system 16 in order to reduce an attack surface of the computing environment 10. In some cases, once a user is authenticated for a given service provider, other request from other service providers during a given (i.e., any particular one) authenticated session involving the identity provider and the user may be deemed authenticated without the user needing to resupply their credentials. Some embodiments may terminate such a session upon a threshold amount of time occurring or upon the user ceasing to have any current sessions ongoing with any of the service-provider computer systems 16. After an authenticated session is terminated with the identity-provider computer system 12, the user may be asked to (via a user interface displayed at the instruction one of computer systems 12 or 16) resupply their username and password or other credentials.

In some embodiments, the authenticator 22 may be configured to make authentication (or authorization) determinations by comparing user credentials supplied in the request (which may include multiple exchanges over time, e.g., one with a username and another with a password) with corresponding user credentials in the user credential repository 24. For instance, some embodiments may determine whether a supplied password associated with a username matches a stored password associated with the same username in the user credential repository 24. In some embodiments, passwords in the user credential repository 24 may not be stored in plaintext, and some embodiments may store an encrypted version of a password, such as a cryptographic hash calculated with an SHA-2 hash algorithm or other hash algorithms. Upon receiving a password in a request to authenticate a user, some embodiments may apply the same hash function to the received credential and compare the hashed received credential to the stored hash value to determine whether they match. This approach is expected to help protect passwords in the event of a data breach in which a malicious party gains access to the user credential repository 24, as the attacker would merely obtained encrypted values without providing the plaintext passwords.

In some embodiments, the authenticator 22 may communicate the result of an authentication determination to the assertion composer 30, which may compose a reply to the requesting device or system indicating whether the user computing device is authenticated.

As noted above, the structure and attributes of this reply may be different for each of the different service providers (corresponding to the different service-provider computer systems 16). This heterogeneity may give rise to substantial complexity, which may increase latency and make the identity-provider computer system 12 difficult to manage and reason about. In some embodiments, this complexity may be mitigated by the dispatcher 26 and the configuration component repository 28, for instance, by implementing the techniques described below with reference to FIGS. 2 and 3. In some embodiments, the dispatcher 26 may receive the identifier of the service provider corresponding to the request, for instance, from the authenticator 22, the server 20, the assertion composer 30, or in a list of identifiers in a batch process. Then, the dispatcher 26 may form a reply-configuration specification specific to the service provider, i.e., one that complies with the requirements of the corresponding service provider to effectively communicate a result of an authentication determination. These requirements may be different for each of the different service providers, though in some cases, portions of the requirements may be the same among multiple service providers, and some of the requirements may be the same for all of the service providers. In some embodiments, the reply-configuration specification may be formed dynamically, in response to receiving the request. This approach is expected to accommodate revisions in the various components of the reply-configuration specification over time with relatively little computational complexity.

Or some embodiments may form the reply-configuration specification (or a portion thereof) in advance, for instance, as part of a hourly or daily batch process for every one of the service providers, which is expected to produce relatively fast, low latency accessible reply-configuration specifications for composing a reply. In this faster example, at use-time, or as a periodic process (like every minute or hourly), some embodiments may verify that each component of a reply-configuration specification has not expired, for instance, due to a new version being implemented, before using the preformed reply-configuration specification. Upon determining that at least one component has expired, some embodiments may dynamically re-form the reply-configuration specification and replace the preformed one with the dynamically formed one for subsequent use, for instance, in a cache of pre-formed reply-configuration specifications. In some embodiments, each pre-formed reply-configuration specifications may include a component string including version numbers of each component, and some embodiments may compare each of those version numbers to a repository of then current version numbers for components to make the preceding determination.

The reply-configuration specification may take a variety of different forms, depending upon the type of shared authentication or authorization protocol in use. Examples consistent with the security assertion markup language protocol is shown below.

Base SAML:

```
{
  "displayName": "Generic SAML",
  "_schema": "applicationGenericSaml",
  "sso": {
    "appConfig": {
      "responseIsssuerRequired": false,
```

-continued

```
    "issueLag": 5,
    "responseValidity": 5,
    "ssoIdPRequest": {
        "binding": "urn:oasis:names:tc:SAML:2.0:bindings:
        HTTP-POST"
    }
  },
  "idPConfig": {
    "issuer": "https URL of security.com",
    "issuerFormat": "urn:oasis:names:tc:SAML:2.0:nameid-format:
    entity",
    "subjectConfirmationMethod": "urn:oasis:names:tc:SAML:2.0:cm:
    bearer",
    "signatureLocation": "Assertion",
    "authnContextClassRef":
"urn:oasis:names:tc:SAML:2.0:ac:classes:PasswordProtectedTransport"
  }
 }
}
```

Rally™ SAML derived from base SAML:

```
{
    "__schema": "applicationRally",
    "sso": {
        "spName": "rally",
        "appConfig": {
            "acsUrl": "https URL of sso.rallydev.com/sp/ACS.saml2",
            "entityId": "sso.rallydev.com",
            "relayState": "https URL of
rally1.rallydev.com/slm/j__sso__security__check",
            "nameIdFormat": "urn:oasis:names:tc:SAML:1.1:nameid-
format:emailAddress",
            "nameId": {
                "type": "attribute",
                "value": "userName"
            },
            "ssoSpRequest": {
                "signingCert": "-----BEGIN CERTIFICATE-----\r\n\r\[signing-
cert-here]\r\n-----END CERTIFICATE-----\r\n\r\n"
            }
        },
        "idPConfig": {
            "issuer": {
                "type": "template",
                "value": "CASaaSAppSecurity-{{application.__id}}"
            }
        }
    }
}
```

Of note, the above derived example includes variables. The "issuer" configuration is of type "template," where the value is arrived at from the "application id." Thus, when the above configuration is used to form a response, some embodiments may parse the "issuer" field, detect the reserved term "template" therein, and then retrieve a value for the "issuer" field based on the reference in the "value" sub-field. In some cases, variables may be evaluated when forming the configuration to populate portions of the configuration, or in some cases, variables may be evaluated when forming the reply based on the configuration. In some cases, the "value" field may reference parameters in program state (e.g., parameters supplied to a function called to form the reply based on the configuration), or in some cases, the "value" field may include a query to another data source, like a SQL query to a relational database, an xpath query for XML, a JSONpath query for JSON, or a regular expression for various other strings or types of documents. Some embodiments may include other types of templates or values, e.g., variables that denote conditional branding, e.g., "value: if X, then value is Y, else, value is Z." Some templates or values may reference other functions and include parameters of those other functions, and embodiments may apply to the parent field values returned by the functions based on the parameters.

The various fields in this example have configurations for the properties described in the SAML specification, such as the version 2.0 specification. (It should be noted that the specification for a protocol is distinct from the reply-configuration specification for a particular implementation of the protocol, as protocols often permit a range of design choices and parameter settings in any given implementation.) Each preceding line is an example of a configuration setting or reference to a nested group of settings. Other configuration settings may be schema settings that indicate how to format, validate, permit, or require one of the lines above. The configuration settings may be grouped into configuration components, each having or otherwise at least in part specifying (e.g., by indicating types of permitted values), at least one configuration setting, and the configuration components may be combined by the dispatcher 26 to form the reply-configuration specification, for instance, as described below with reference to FIGS. 2 and 3.

In some embodiments, the assertion composer 30 may form a reply to a request for authentication (or authorization) based on both the reply-configuration specification and the result of an authentication determination. In some cases, forming the reply may include inserting a result of the authentication determination into a given field designated for the result in the reply-configuration specification. In some cases, composing the reply may include populating a number of fields in accordance with a schema indicated by the reply-configuration specification. For instance, a given reply-configuration specification may include some configuration settings that indicate fields and values, and some configuration settings that indicate fields and how to determine the values (e.g., a query, or reference to a variable from which a value may be determined). Some embodiments may determine those values that are not yet determined and populate the corresponding fields.

Examples of reply-time determined values (in contrast to pre-determined values, such as those determined or otherwise obtained before receiving a request for authentication) include calculating various cryptographic signatures, for instance, in accordance with an asymmetric encryption protocol, like various forms of public key encryption, such as the RSA or DSA algorithms. Some examples include supplying a security certificate, such as an x.509 certificate.

In some embodiments, forming the reply includes creating a copy of the reply-configuration specification, parsing the copy for fields having values that need to be determined, determining those values, and storing those values in the corresponding fields of the copy. Or, some embodiments may form the reply as a separate document. In some embodiments, forming the reply includes forming a hierarchical serialized document, like a JSON or an XML document. In some cases, the type of serialization may be specified by the reply-configuration specification. In some embodiments, the reply-configuration specification may indicate other aspects of a reply, such as protocol binding supported by the service-provider computer system to which the reply is to be sent. Examples of protocol bindings include application layer and transport layer protocol bindings. For example, some embodiments may indicate whether HTTP or HTTPS is to be used. Some protocol bindings may indicate use of SSL or TLS, and which versions, are permitted or required. In some embodiments, the configuration settings indicate attributes required by the service-provider computer system to which the reply is to be sent, such as pairs of fields and corresponding values required to effectively communicate a determination.

Based on the above example reply-configuration specification, a reply may be composed, taking for instance the following form:

SAML Response (Assertion) for Rally™:

```
<Response Destination="https URL of sso.rallydev.com/sp/ACS.saml2"
         ID="_[ID-code-here]"
         IssueInstant="2017-01-20T15:43:58.817Z"
         Version="2.0"
         xmlns="urn:oasis:names:tc:SAML:2.0:protocol"
         >
    <saml2:Issuer  Format="urn:oasis:names:tc:SAML:2.0:nameid-format:entity"
                   xmlns:saml2="urn:oasis:names:tc:SAML:2.0:assertion"
                   >CASaaSAppSecurity-[issuer-code-here] </saml2:Issuer>
        <ds:Signature xmlns:ds="http URL of www.w3.org/2000/09/xmldsig#">
            <ds:SignedInfo>
                <ds:CanonicalizationMethod Algorithm="http URL of www.w3.org/2001/10/xml-exc-c14n#" />
                <ds:SignatureMethod Algorithm="http URL of www.w3.org/2000/09/xmldsig#rsa-sha1" />
                <ds:Reference URI="#_5f790b88-6998-4d5b-b77a-fdbf5482da97">
                    <ds:Transforms>
                        <ds:Transform Algorithm="http URL of www.w3.org/2000/09/xmldsig#enveloped-signature" />
                        <ds:Transform Algorithm="http URL of www.w3.org/2001/10/xml-exc-c14n#" />
                    </ds:Transforms>
                    <ds:DigestMethod Algorithm="http URL of www.w3.org/2000/09/xmldsig#sha1" />
                    <ds:DigestValue>[digest-value-here] =</ds:DigestValue>
                </ds:Reference>
            </ds:SignedInfo>
            <ds:SignatureValue>[signature-value-here]</ds:SignatureValue>
            <ds:KeyInfo>
                <ds:X509Data>
                    <ds:X509Certificate>[certificate-code-here] </ds:X509Certificate>
                </ds:X509Data>
            </ds:KeyInfo>
        </ds:Signature>
        <saml2p:Status xmlns:saml2p="urn:oasis:names:tc:SAML:2.0:protocol">
            <saml2p:StatusCode Value="urn:oasis:names:tc:SAML:2.0:status:Success" />
        </saml2p:Status>
        <saml2:Assertion   ID="_57dcb2e1-a302-44db-aa84-946c1f388665"
                           IssueInstant="2017-01-20T15:43:58.817Z"
                           Version="2.0"
                           xmlns:saml2="urn:oasis:names:tc:SAML:2.0:assertion"
                           >
            <saml2:Issuer Format="urn:oasis:names:tc:SAML:2.0:nameid-format:entity">CASaaSAppSecurity-4f6a9c83-9cb7-419f-9531-f9fbf9c87323</saml2:Issuer>
            <ds:Signature xmlns:ds="http URL of www.w3.org/2000/09/xmldsig#">
                <ds:SignedInfo>
                    <ds:CanonicalizationMethod Algorithm="http URL of www.w3.org/2001/10/xml-exc-c14n#" />
                    <ds:SignatureMethod Algorithm="http URL of www.w3.org/2000/09/xmldsig#rsa-sha1" />
                    <ds:Reference URI="#_57dcb2e1-a302-44db-aa84-946c1f388665">
                        <ds:Transforms>
                            <ds:Transform Algorithm="http URL of www.w3.org/2000/09/xmldsig#enveloped-signature" />
                            <ds:Transform Algorithm="http URL of www.w3.org/2001/10/xml-exc-c14n#" />
                        </ds:Transforms>
                        <ds:DigestMethod Algorithm="http URL of www.w3.org/2000/09/xmldsig#sha1" />
                        <ds:DigestValue>eFK7HFHxVZFeFEVn+K/liIi/tJw=</ds:DigestValue>
                    </ds:Reference>
                </ds:SignedInfo>
                <ds:SignatureValue>[signature-value-here] </ds:SignatureValue>
                <ds:KeyInfo>
                    <ds:X509Data>
                        <ds:X509Certificate>[certificate-value-here] </ds:X509Certificate>
                    </ds:X509Data>
                </ds:KeyInfo>
            </ds:Signature>
            <saml2:Subject>
                <saml2:NameID Format="urn:oasis:names:tc:SAML:1.1:nameid-format:emailAddress">email-address @ company.com</saml2:NameID>
                <saml2:SubjectConfirmation Method="urn:oasis:names:tc:SAML:2.0:cm:bearer">
```

```
                <saml2:SubjectConfirmationData    NotOnOrAfter="2017-01-20T15:48:58.817Z"
                                                  Recipient="https URL of
sso.rallydev.com/sp/ACS.saml2"
                                                  />
            </saml2:SubjectConfirmation>
        </saml2:Subject>
        <saml2:Conditions    NotBefore="2017-01-20T15:38:58.817Z"
                             NotOnOrAfter="2017-01-20T15:48:58.817Z"
                             >
            <saml2:AudienceRestriction>
                <saml2:Audience>sso.rallydev.com</saml2:Audience>
            </saml2:AudienceRestriction>
        </saml2:Conditions>
        <saml2:AuthnStatement AuthnInstant="2017-01-20T15:43:58.817Z">
            <saml2:AuthnContext>
<saml2:AuthnContextClassRef>urn:oasis:names:tc:SAML:2.0:ac:classes:PasswordProtectedTransport
</saml2:AuthnContextClassRef>
            </saml2:AuthnContext>
        </saml2:AuthnStatement>
    </saml2:Assertion>
</Response>
```

Additional examples are given in a program code listing filed herewith, the contents of which are hereby incorporated by reference.

In some embodiments, the assertion composer 30 may send the formed reply to the server 20 in association with a session identifier, and the server 20 may identify a port and network address to which to send the reply based on the session identifier. The server 20 may then send the reply indicating the result of the authentication determination in a message that is compliant with the reply-configurations specification specific to the service provider to which the user computing device 14 seeks access. As noted above, in some cases, the reply is sent to a service-provider computer system 16, without passing through a user computing device 14, for instance, in a message addressed by the server 20 to a network address of the service-provider computer system 16. Or in some cases, replies may be communicated to a service-provider computer system 16 via a user computing device 14, for instance, by sending a redirect command to a user computing device 14 having a URL of a service-provider computer system 16 and URL parameters containing the formed reply (e.g., in some OAuth implementations).

Figure 2:
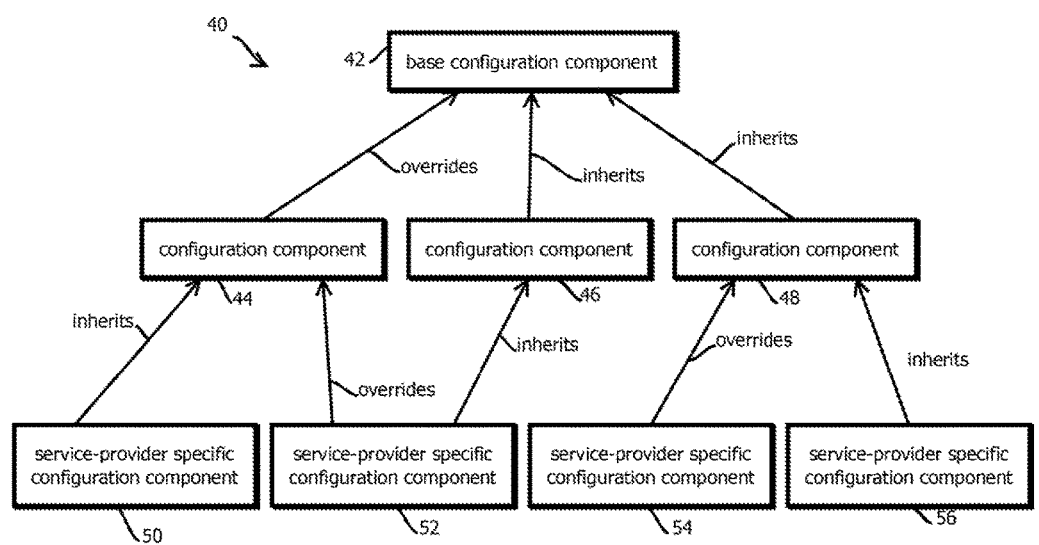
FIG. 2 is a configuration component graph in accordance with some embodiments.

FIG. 2 shows an example data model of the configuration-component repository 28 described above. In this example, configuration components are arranged in a graph 40. A data structure or other collection of information can constitute a graph without being labeled as a graph in program code provided that it has the attributes of a graph, as that term is used in the field of computer science. The illustrated graph 40 includes a plurality of configuration components 42, 44, 46, 48, 50, 52, 54, and 56, which each serve as respective nodes of the graph 40. In this example, the graph 40 is a directed graph having edges extending between pairs of the nodes, those edges indicating that one node invokes the other node in the direction indicated by the arrow.

In some embodiments, the graph 40 further includes attributes associated with each edge, those attributes indicating a type of relationship between the pair of nodes connected by the edge. In the illustrated example, there are two types of relationships, overrides and inherits, which indicate how the referencing node is to be combined with the referenced node. In some embodiments, a node that inherits from another node is combined by appending (or otherwise grouping together) the two configuration components, such that the referencing node has the attributes of the referenced node as expressed in the referenced node. In some embodiments, a node that overrides a reference node replaces some or all of the configuration settings of the referenced node. For instance, the same configuration setting field may appear both in a referencing node and a referenced node, and the configuration setting of the referencing node may control in the combination, with the other attributes of the referenced node otherwise being inherited. Embodiments may parse pairs of nodes in such a relationship to identify duplicate entries, reference a type of relationship to determine how to resolve the conflict, and replace the overridden values.

In some cases, the graph 40 may be characterized as a call graph in which edges are denoted by sequences of tokens, like strings, within documents that reference another configuration component and indicate a type of relationship, for instance, a statement that configuration component 50 (within a body of text defining configuration component 50, like a JSON document) inherits from configuration component 44 (in some cases specifying a subset of component 44). In this example, a body of text defining configuration component 44 may similarly include a string that identifies a base configuration component 40 and indicates that configuration component 44 overrides base configuration component 42. Some embodiments may parse the text in each of the bodies of text corresponding to a given configuration component to identify these references and the corresponding relationships and, then, combine the configuration components as indicated by that parsed text, for instance, as indicated below with reference to FIG. 3.

In some embodiments, the graph 40 may be expressed as a collection of hierarchical serialized format documents, each corresponding to one of the illustrated configuration components. In some embodiments, a plurality of the configuration components may be expressed in a single hierarchical serialized format document, for instance, with different configuration components being expressed at lower levels of the hierarchy, like in a list. In some embodiments, the graph 40 may be expressed in program state, for instance, as a collection of objects having as attributes the other indicated edges. In some embodiments, the graph 40 may be stored in various forms of databases, like a document database, such as the MongoDB™ database, a key-value store, or as entries in a relational database.

In some embodiments, the graph 40 may be a tree graph with a hierarchy or a forest graph with a plurality of hierarchies. In some embodiments, the graph 40 may be a graph in which every node is reachable by at least one other node of the graph. In some embodiments, the graph 40 may be an acyclic graph. In some embodiments, the graph 40 includes a base configuration component 42 referenced directly or indirectly by every other configuration component. In some embodiments, the graph 40 may include service-provider specific configuration components 50, 52, 54, and 56, which may be leaf nodes of a tree graph and, in some cases, may uniquely correspond to a respective one of the service providers. In some embodiments, the dispatcher 26 may select a service-provider specific configuration component as an entry into the graph 40 to form a corresponding reply-configuration specification.

In some cases, the service-provider specific components may not be the leaf nodes, and these components may be referenced by other, more specific components. For instance, each organization managing accounts for members of the organization (e.g., employees of a company) may have an organization-specific, service-provider specific component.

As indicated, reply-configuration specifications may be composed from a plurality of the illustrated configuration components of the graph 40. In some cases, a path (along edges) through the graph 40 may define how to form the reply-configuration specification corresponding to that path. In some cases, a given configuration component may be shared by multiple reply-configuration specifications, in some cases with different types of relationships to other configuration components. In some cases, some configuration components may be specific to a given reply-configuration specification, without being shared with other reply-configuration specifications. In some cases, the base-configuration component 42 may be shared by every reply-configuration specification denoted in the graph 40.

Figure 3:
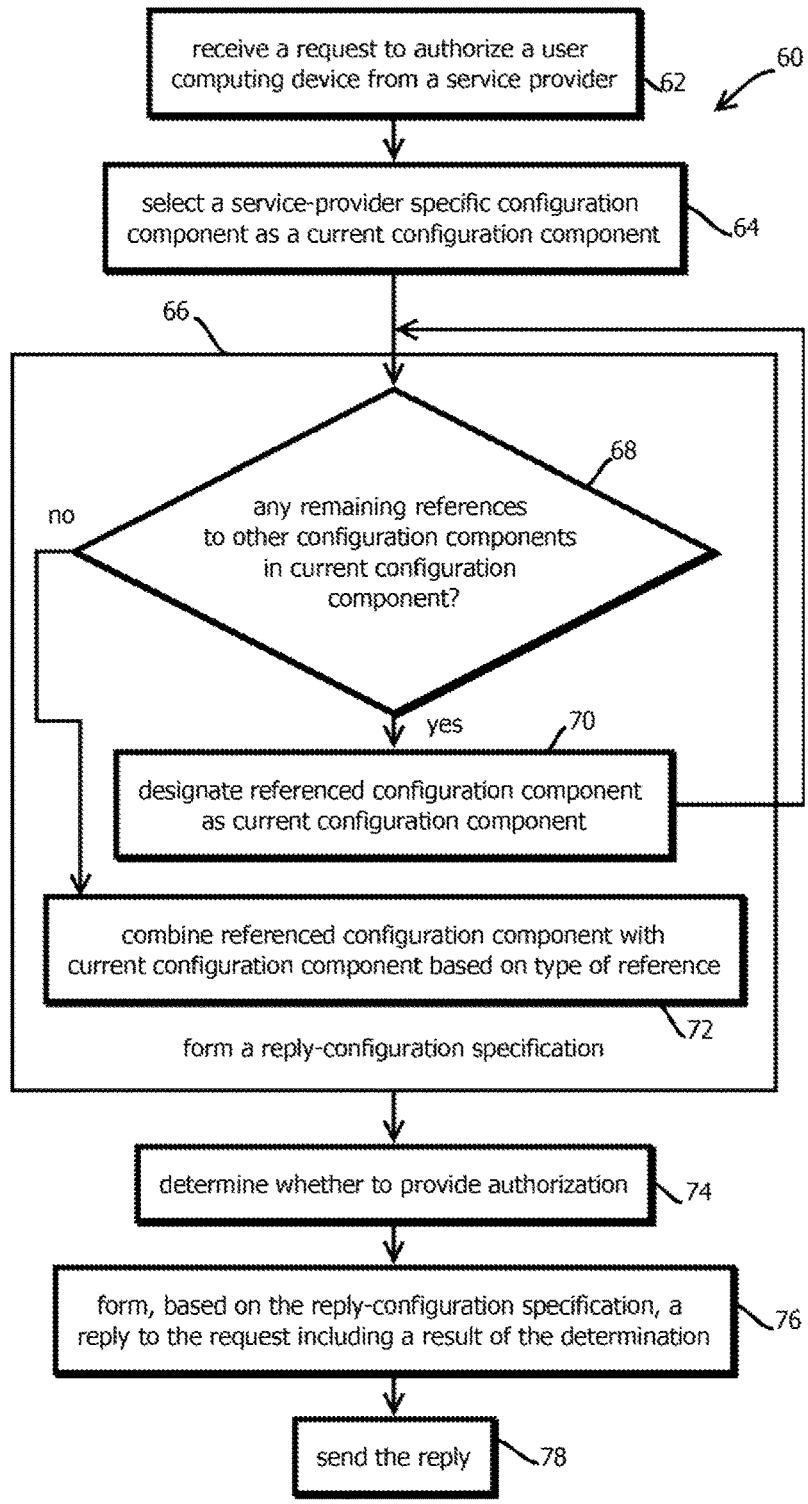
FIG. 3 is a flowchart of an example of an authorization process in accordance with some embodiments.

FIG. 3 shows an example of a process 60 that may be performed by the identity-provider computer system 12 described above, but is not limited to that implementation. In some cases, the process 60 may be performed multiple times, concurrently, in overlapping sessions corresponding to different requests for authorization or authentication. In some cases, the illustrated steps may be performed in a different order from that indicated, which is not to suggest that other embodiments described herein are not also similarly amenable to variation. In some embodiments, instructions that cause a computing system to perform the process 60, or otherwise implement functionality described herein, may be stored on a tangible, non-transitory, machine-readable medium, for instance in the form of program code and data operated upon that by that program code. In some cases, the medium may be distributed, such that portions of the medium are resident in different computing devices that perform different subsets of the instructions, or in some cases, the medium may be resident within a single computing device.

In some embodiments, the process 60 begins with receiving a request to authorize a user computing device from a service provider, as indicated by block 62. In some cases, this request may be received by the server 20 described above. In some cases, the received request may be routed through a user computing device, or in some cases, the received request may be received without the request passing through a user computing device.

Next, some embodiments may select a service-provider specific configuration component as a current configuration component, as indicated by block 64. In some cases, this may include parsing a service provider identifier from the received request and selecting one of the service-provider specific configuration components 50, 52, 54, or 56 shown in FIG. 2 based on that configuration component corresponding with the identifier.

Next, some embodiments may form a reply-configuration specification by recursively executing a sequence of steps to traverse a graph denoting reply-configuration specifications for each of a plurality of different service providers, such as the graph of FIG. 2. In some cases, the traversal may be a depth first traversal or a breadth first traversal. In some cases, the traversal is achieved through a recursive traversal, in which a routine processing a given configuration component identifies references to other configuration components and, upon identifying such a reference, calls itself with the referenced configuration component as a function call parameter to be operated upon.

Some embodiments include determining whether there are any remaining references to other configuration components in a current configuration component, as indicated by block 68. This may include parsing text describing a configuration component to identify tokens indicating references. A reference is said to remain if subsequent operations described with reference to block 66 have not yet been initiated for that reference. Upon determining that another reference remains, some embodiments may designate the referenced configuration component as a current configuration component, as indicated by block 70, in a function call to a routine that forms the reply-configuration specification, as indicated by block 66. Thus, some embodiments may then determine whether that referenced configuration component references other configuration components, in some cases through nested recursive calls traversing a graph. In some cases, the number of recursions corresponding to edges in the graph may be relatively large, for instance, exceeding 3, 5, or 15 in particularly complex arrangements.

Upon determining that no referenced configuration components remain (or in some cases concurrently with processing other reference configuration components), some embodiments may combine referenced configuration components with a current configuration component based on a type of the reference, as indicated by block 72. In some cases, this may include determining the type of reference, for instance, an inherits or overrides reference, and combining based on this type. In some cases, the combination may take the form described above with reference to examples by which one configuration component inherits from another or by which one configuration component overrides another.

Thus, some embodiments may form the reply-configuration specification through this combination based on a polymorphic denotation of reply-configuration specifications. A variety of different types of polymorphic arrangements may be used, depending upon various trade-offs in expressiveness and complexity, including ad hoc polymorphism and parametric polymorphism. As indicated, combination may take a variety of different forms, including replacing values in one component with values in another, inserting values from one component fields in another, creating a new record based on to previously existing records, and modifying an existing record based on another record, assigning values to variables in one component based on values in another, or the like.

Next, some embodiments may determine whether to provide authorization, as indicated by block 74. This may include performing the operations attributed above to the authenticator 22.

Next, some embodiments may form, based on the reply-configuration specification, a reply to the request including a result of the determination, as indicated by block 76. In some embodiments, this may include performing the operations attributed above to the assertion composer 30 of FIG. 1. As indicated, "forming" may be implemented in variety of ways, including composing a new record (e.g., information in program state or data structure in persistent storage) based on previously existing records or modifying an existing record based on other records.

Next, some embodiments may send the reply, as indicated by block 78. As discussed above, in some cases, sending the reply may include sending the reply directly to the requesting service provider or routing the reply through the user computing device, for instance with a redirect instruction sent to the user computing device including the reply as a URL parameter.

In some embodiments, the above techniques may be used in an identity management system, like that described below with reference to FIG. 4, but it should be appreciated that these techniques are useful in a variety of different other use cases, only some examples of which are described above.

Figure 4:
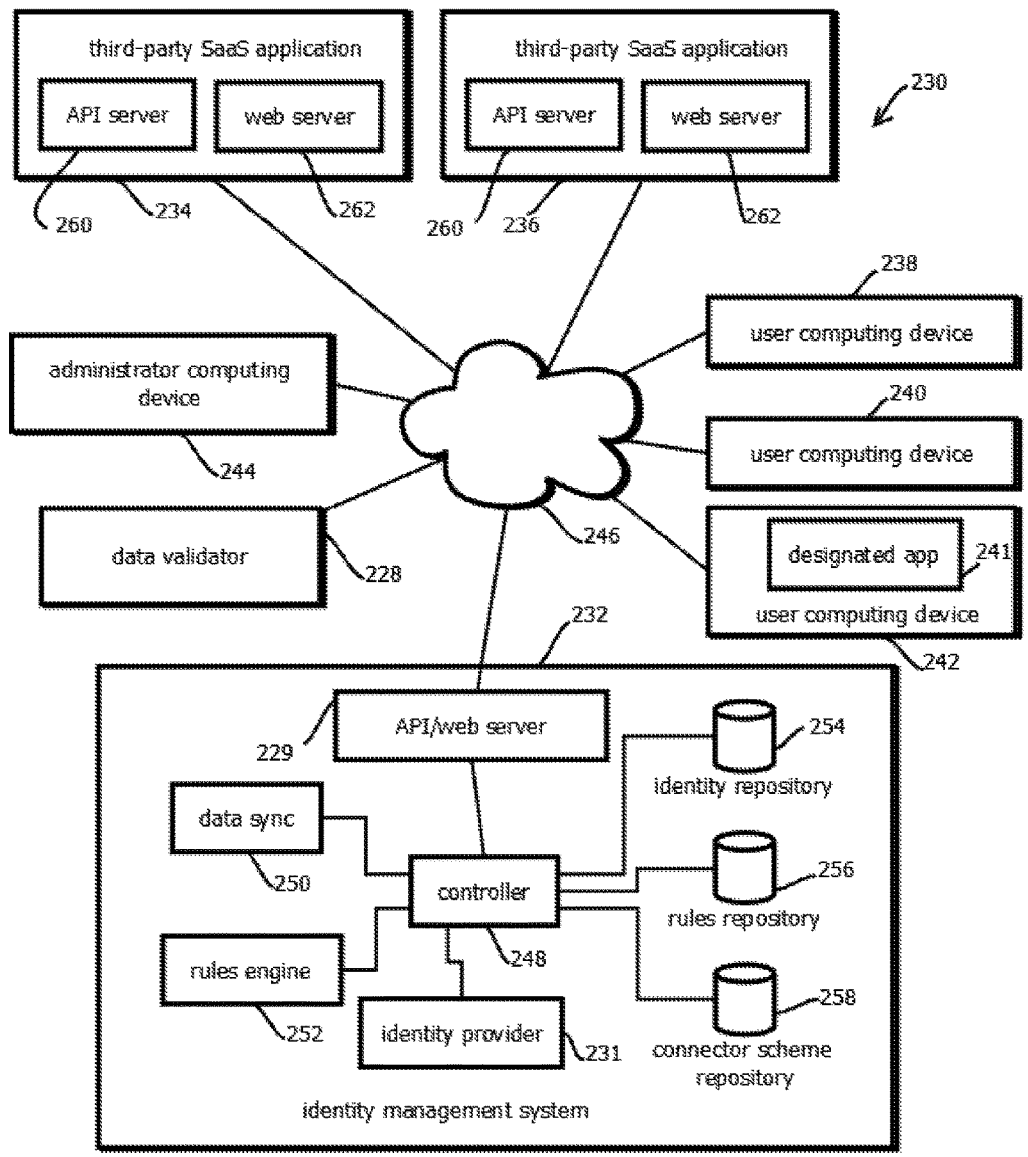
FIG. 4 is an example of an identity management system in which the preceding system, graph, and process may be implemented in accordance with some embodiments.

FIG. 4 is a block diagram of a computing environment 230 in which the above-described techniques may be implemented, though it should be emphasized that this is one example of a variety of different systems that are expected to benefit from the presently described techniques.

As enterprises move their applications to the cloud, and in particular to SaaS applications provided by third parties, it can become very burdensome and complex to manage roles and permissions of employees. For example, a given business may have 20 different subscriptions to 20 different SaaS offerings (like web-based email, customer resource management systems, enterprise resource planning systems, document management systems, and the like). And that business may have 50,000 employees with varying responsibilities in the organization, with employees coming and going and changing roles regularly. Generally, the business would seek to tightly control which employees can access which SaaS services, and often which features of those services each employee can access. For instance, a manager may have permission to add or delete a defect-tracking ticket, while a lower-level employee may only be allowed to add notes or advance state of the ticket in a workflow. Or certain employees may have elevated access to certain email accounts or sensitive human resources related documents. Each time an employee arrives, leaves, or changes roles, different sets of SaaS user accounts may need to be added, deleted, or updated. Thus, many businesses are facing a crisis of complexity, as they attempt to manage roles in permissions across a relatively large organization using a relatively large number of SaaS services with relatively fine-grained feature-access controls.

These issues may be mitigated by some embodiments of the computing environment 230, which includes an identity management system 232 that manages roles and permissions on a plurality of different third-party SaaS applications 234 and 236. In some cases, the SaaS applications may be accessed by users having accounts and various roles, subject to various permissions, on user computing devices 238, 240, or 242, and those accounts may be managed by an administrator operating administrator computing device 244. In some cases, the user computing devices and administrator computing device may be computing devices operated by a single entity, such as a single entity within a single local area network or domain. Or in some cases, the user computing devices 238, 240, and 242 may be distributed among a plurality of different local area networks, for instance, within an organization having multiple networks. In the figure, the number of third-party application servers and user computing devices is two and three respectively, but it should be appreciated that commercial use cases are expected to involve substantially more instances of such devices. Expected use cases involve more than 10 third-party SaaS applications, and in many cases more than 20 or 50 third-party SaaS applications or on-premises applications. Similarly, expected use cases involve more than 1,000 user computing devices, and in many cases more than 10,000 or more than 50,000 user computing devices. In some cases, the number of users is expected to scale similarly, in some cases, with users transitioning into new roles at a rate exceeding 10 per day, and in many commercially relevant use cases, exceeding 100 or 1,000 per day on average. Similarly, versioning of third-party APIs and addition or subtraction of third-party APIs is expected to result in new APIs or new versions of APIs being added monthly or more often in some use cases.

In some embodiments, the user computing devices 238, 240, and 242 may be operated by users accessing or seeking access to the third-party SaaS applications, and administrator computing device 244 may be operated by a system administrator that manages that access. In some embodiments, such management may be facilitated with the identity management system 232, which in some cases, may automatically create, delete, or modify user accounts on various subsets or all of the third-party SaaS applications in response to users being added to, removed from, or moved between, roles in an organization. In some embodiments, each role may be mapped to a plurality of account configurations for the third-party SaaS applications. In some embodiments, in response to a user changing roles, the administrator may indicate that change in roles via the administrator computing device 244, in a transmission to the identity management system 232. In some embodiments, the device 242 may execute an example of the above-described designated application 241.

In response to this transmission, the identity management system may retrieve from memory and updated set of account configurations for the user in the new role, and records of these new account configurations may be created in a graph database in the identity management system 232. That graph database and the corresponding records may be synchronized with corresponding third-party applications 234 and 236 to implement the new account configurations. Further, in some cases, a new deployment of the identity management system 232 may contain a graph database populated initially by extracting data from the third-party SaaS applications and translating that data into a canonical format suitable for the graph database. In some embodiments, the third-party SaaS applications may include an API server 260 and a web server 262.

In some embodiments, the computing environment 230 includes a data validator 228 that validates data according to diverse data schemas. In some cases, the data validator includes a document database storing diverse schemas, a schema formation module that performs a process to form schemas, including a schema crawler configured to recursively crawl through a set of linked schemas, and modules that combine criteria from the schemas. In some cases, the data validator 228 may validate data entering the identity repository 254 of the identity management system 232.

In some embodiments, the identity management system 232 may include a web/API server 229. In some embodiments, the server 229 may receiving in-bound or out-bound data, identify a corresponding document specifying how to translate between API formats (or constitute the document via references expressing inheritance and polymorphism), and perform a process to translate data between external data schemas and an internal data schema of the identity repository 254.

In some embodiments, each of the third-party SaaS applications are at different domains, having different subnetworks, at different geographic locations, and are operated by different entities. In some embodiments, a single entity may operate multiple third-party SaaS applications, for instance, at a shared data center, or in some cases, a different third-party may host the third-party SaaS applications on behalf of multiple other third parties. In some embodiments, the third-party SaaS applications may be geographically and logically remote from the identity management system 232 and each of the computing devices 238, 240, 242, and 244. In some embodiments, these components 232 through 242 may communicate with one another via various networks, including the Internet 246 and various local area networks.

In some embodiments, the identity management system 232 includes a controller 248, an identity provider 231, a data synchronization module 250, a rules engine 252, and identity repository 254, a rules repository 256, and a connector schema repository 258. In some embodiments, the controller 248 may direct the operations described above, in some cases by communicating with the various other modules of the identity management system and the other components of the computing environment 230. In some embodiments, the data synchronization module 250 may be configured to synchronize records in the identity repository 254 with records in the third-party SaaS applications, for instance by translating those records at the direction of the controller 248. For instance, a user may transfer into a sales group at a company, and the rules may indicate that in the new role, the user is be given a SaaS customer-relationship management account, and that account is to be added in the SaaS application to a group corresponding to a geographic sales region. These may lead to sequential tasks, where the account needs to be created via the API, before the API can be commanded to add the account to a group.

In some embodiments, the identity provider 231 accesses user credentials in the identity repository 256, which may host the above-described user credentials 24. In some cases, the above-described configuration-component repository 28 may be stored in the connector scheme repository 258. In some embodiments, the API/Web server 229 may serve the role of the server 20 described above. Other components of the above-described identity provider 12 of FIG. 1 may be resident in the identity management system as identity provider 231, or the identity provider 231 may be structured as described above with reference to FIG. 1 without being further integrated into the identity management system 232. In some cases, the third-party SaaS applications 234 and 236 may perform the operations described above by the service-provider computer systems 16.

In some embodiments, the rules engine 252 may be configured to update the identity repository 254 based on rules in the rules repository 256 to determine third-party SaaS application account configurations based on changes in roles of users, for instance received from the administrator computing device 244, at the direction of controller 248. In some embodiments, the administrator computing device 244 may send a command to transition a user from a first role to a second role, for instance, a command indicating the user has moved from a first-level technical support position to a management position. In response, the controller 248 may retrieve a set of rules (which may also be referred to as a "policy") corresponding to the former position and a set of rules corresponding to the new position from the rules repository 246. In some embodiments, these sets of rules may indicate which SaaS applications should have accounts for the corresponding user/role and configurations of those accounts, like permissions and features to enable or disable. In some embodiments, these rules may be sent to the rules engine 252, which may compare the rules to determine differences from a current state, for instance, configurations to change or accounts to add or remove. In some embodiments, the rules engine 252 may update records in the identity repository 254 to indicate those changes, for instance, removing accounts, changing groups to which users belong, changing permissions, adding accounts, removing users from groups, and the like. In some cases, applying the rules may be an example of unordered tasks performed by the system. In some embodiments, these updates may be updates to a graph data structure. In some embodiments, the graph data structure may be a neo4j graph database available from Neo Technology, Inc. of San Mateo, Calif. In some embodiments, the controller 248 may respond to these updates by instructing the data sync module 252 translate the modified nodes and edges into API commands and sending those API commands to the corresponding third-party SaaS applications.

In some embodiments, the identity repository 254 may include a graph data structure indicating various entities and relationships between those entities that describe user accounts, user roles within an organization, and the third-party SaaS applications. For instance, some embodiments may record as entities in the graph data structure the third-party SaaS applications, accounts of those applications, groups of user accounts (in some cases in a hierarchical taxonomy), groups of users in an organization (again, in some cases in a hierarchical taxonomy, like an organizational structure), user accounts, and users. Each of these nodes may have a variety of attributes, e.g., user names for user accounts, user identifiers for users, group names, and group leaders for groups, and the like. In some embodiments, the graph data structure may be a neo4j graph database available from Neo Technology, Inc. of San Mateo, Calif.

In some embodiments, these nodes may be related to one another through various relationships that may be encoded as edges of the graph. For instance, an edge may indicate that a user is a member of a subgroup, and that that subgroup is a member of a group of subgroups. Similarly, and edge may indicate that a user has an account, and that the account is a member of a group of accounts, like a distribution list. In some examples, and edge may indicate that an account is with a SaaS application, with the respective edge linking between a node corresponding to the particular account and another node corresponding to the SaaS application. In some embodiments, multiple SaaS applications may be linked by edges to a node corresponding to a given party, such as a third-party.

In some embodiments, this data structure is expected to afford relatively fast operation by computing systems for certain operations expected to be performed relatively frequently by the identity management system 232. For instance, some embodiments may be configured to relatively quickly query all accounts of the user by requesting all edges of the type "has_an_account" connected to the node corresponding to the user, with those edges identifying the nodes corresponding to the respective accounts. In another example, all members of a group may be retrieved relatively quickly by requesting all nodes connected to a node correspond to the group by an edge that indicates membership. Thus, the graph data structure may afford relatively fast operation compared to many traditional systems based on relational databases in which such relationships are evaluated by cumbersome join operations extending across several tables or by maintaining redundant indexes that slow updates. (Though, embodiments are also consistent with use of relational databases instead of graph databases, as multiple, independently useful techniques are described).

Figure 5:
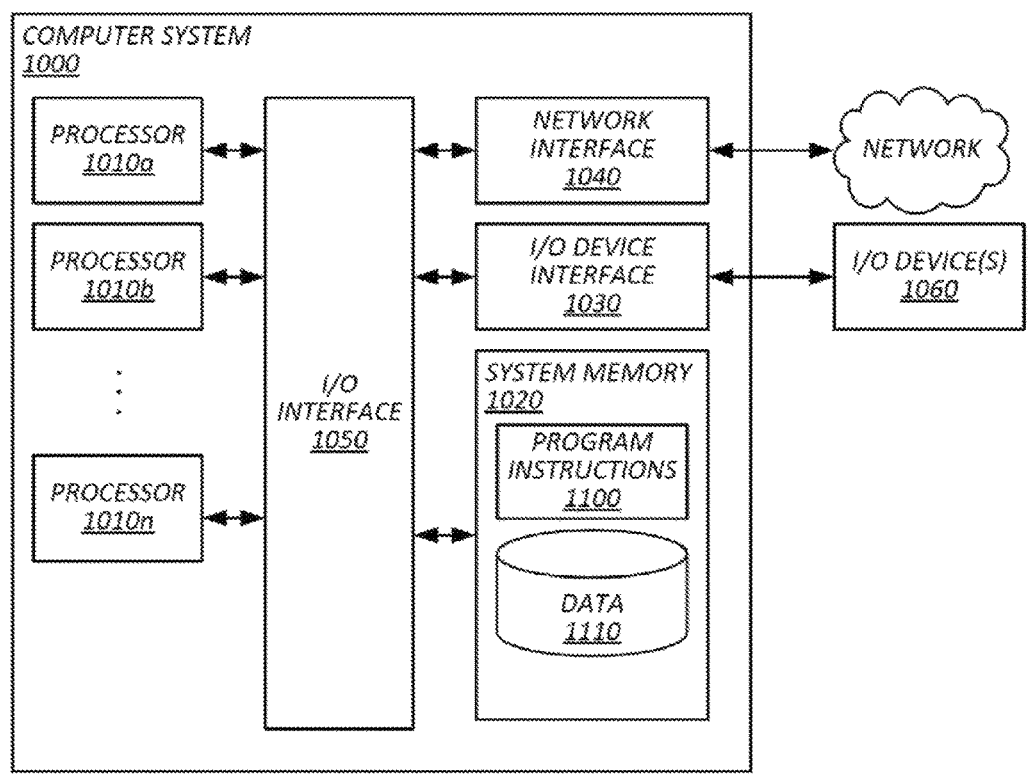
FIG. 5 is an example of a computer system by which the above processes and systems may be implemented in accordance with some embodiments.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the techniques. It is to be understood that the forms of the techniques shown and described herein are to be taken as examples of embodiments. Elements and materials may be substituted for those illustrated and described herein, parts and processes may be reversed or omitted, and certain features of the techniques may be utilized independently, all as would be apparent to one skilled in the art after having the benefit of this description of the techniques. Changes may be made in the elements described herein without departing from the spirit and scope of the techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

To the extent that, in this patent, certain U.S. patents, U.S. patent applications, or other materials (e.g., articles) have been incorporated by reference, the text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more computers effectuate operations comprising: receiving, from a first service-provider computer system or from a user computing device, via a network, with an identity-provider computer system, a request to authenticate a user computing device, wherein: the request specifies a first service provider among a plurality of different service providers on a plurality of different domains for which the identity-provider computer system is configured to make authentication determinations; forming, with the identity-provider computer system, a first reply-configuration specification from a first plurality of configuration components, wherein forming comprises: accessing a graph of configuration components, the graph defining reply-configuration specifications for the plurality of different service providers, the first plurality of configuration components corresponding to a subset of the graph, determining that at least some of the first plurality of configuration components pertain to the first service-provider computer system based on a path in the graph along edges of the graph, and evaluating a relationship defined by an edge of the graph to determine, at least in part, how to combine a pair of configuration components linked by the edge into at least part of the first reply-configuration specification, wherein: at least some of the first plurality of configuration components pertain to service providers among the plurality of different service providers other than the first service provider, and the first reply-configuration specification specifies at least part of a message to communicate an authentication determination to the first service-provider computer system; determining, with the identity-provider computer system, whether to provide authentication; forming, with the identity-provider computer system, based on the first reply-configuration specification, a reply to the request, the reply including a result of the authentication determination; and sending, with the identity-provider computer system, the reply.

2. The medium of embodiment 1, comprising: receiving, from a second service-provider computer system, a request for authentication of another user computing device; accessing the graph of configuration components to obtain a second plurality of configuration components, wherein: the second plurality of configuration components contains at least one configuration component that is not in the first plurality of configuration components; the second plurality of configuration components contains at least one configuration component that is in the first plurality of configuration components; forming, from the second plurality of configuration components, a second reply-configuration specification different from the first reply-configuration specification; and sending a reply to the second service-provider computer system based on the second reply-configuration specification.

3. The medium of any one of embodiments 1-2, wherein: the configuration components in the graph are each a respective document formatted in a hierarchical serialization format; and edges of the graph are denoted in the documents by text referencing another of the documents and indicating a relationship to the referenced document, wherein the combining is based on a type of relationship among a plurality of types of relationships in the graph, with different types corresponding to different ways of combining the documents.

4. The medium of any one of embodiments 1-3, wherein: forming the first reply-configuration specification comprises: parsing a first configuration component to identify a reference to a second configuration component, the reference denoting the edge, the first and second configuration component being the pair of configuration components linked by the edge.

5. The medium of embodiment 4, wherein: the relationship specifies that the first configuration component inherits from the second configuration component; and combining comprises adding a configuration setting from the first configuration component to a plurality of configuration settings in the second configuration component.

6. The medium of embodiment 4, wherein: the relationship specifies that the first configuration component overrides the second configuration component; and combining comprises replacing a configuration setting in the second configuration component with a configuration setting in the first configuration component.

7. The medium of any one of embodiments 1-6, wherein: the graph is a directed acyclic graph; and forming the first reply-configuration specification comprises: recursively traversing the directed acyclic graph in a depth first traversal to form the first reply-configuration specification from three or more configuration components forming three respective nodes on the path in the graph, the recursion beginning with a configuration component uniquely associated with the first service provider among the plurality of different service providers.

8. The medium of any one of embodiments 1-7, wherein: the graph of configuration components comprises a polymorphic arrangement of configuration components in which a base configuration specification is invoked by a plurality of other configuration components to apply configuration settings in the base configuration component in combination with the other configuration components.

9. The medium of embodiment 8, wherein: the polymorphic arrangement is ad hoc polymorphism.

10. The medium of embodiment 8, wherein: the polymorphic arrangement is parametric polymorphism.

11. The medium of any one of embodiments 1-10, wherein: the first reply-configuration specification is formed before receiving the request for authentication; and the operations comprise: after receiving the request for authentication, determining that each configuration component used to form the first reply-configuration specification has not expired.

12. The medium of any one of embodiments 1-11, wherein the first reply-configuration specification comprises: cryptographic signature requirements of the first service-provider computer system for authentication messages; application or transport layer protocol bindings supported by the first service-provider computer system for authentication messages; and attributes required by the first service-provider computer system for authentication messages.

13. The medium of embodiment 12, wherein: the reply includes authentication of a user based on credentials supplied via the user computing device; determining to provide authentication comprises comparing the credentials to stored user credentials associated with a user account; the graph of configuration components includes a plurality of documents each having different subsets of configuration settings of Security Assertion Markup Language configurations corresponding to five or more different service-provider computer systems; sending the reply comprises sending an extensible markup language document satisfying the cryptographic signature requirements via at least some of the protocols among the supported bindings with at least some of the required attributes, wherein the reply includes more than 20 configuration settings.

14. The medium of any one of embodiments 1-13, wherein: forming the first reply-configuration specification comprises steps for instantiating a reply-configuration specification; sending the reply comprises steps for indicating authentication to the first service-provider computer system; and the graph is arranged according to means for specifying a call graph.

15. The medium of any one of embodiments 1-14, wherein: the first reply-configuration specification specifies how to format, for the first service provider, a cryptographically signed Security Assertion Markup Language response having an encrypted cryptographically signed assertion identifier, the format being different from that of at least some of the other service providers.

16. A method comprising: the operations of any one of embodiments 1-15.

17. A system, comprising: one or more processors; and memory storing instructions that when executed by the processors cause the processors to effectuate operations comprising: the operations of any one of embodiments 1-15.

What is claimed is:

1. A tangible, non-transitory, machine-readable medium storing instructions that when executed by one or more computers effectuate operations comprising:
receiving, from a first service-provider computer system or from a user computing device, via a network, with an identity-provider computer system, a request to authenticate a user computing device, wherein:
the request specifies a first service provider among a plurality of different service providers on a plurality of different domains for which the identity-provider computer system is configured to make authentication determinations;
forming, with the identity-provider computer system, a first reply-configuration specification from a first plurality of configuration components, wherein forming comprises:
accessing a graph of configuration components, the graph defining reply-configuration specifications for the plurality of different service providers, the first plurality of configuration components corresponding to a subset of the graph,
determining that at least some of the first plurality of configuration components pertain to the first service-provider computer system based on a path in the graph along edges of the graph, and
evaluating a relationship defined by an edge of the graph to determine, at least in part, how to combine a pair of configuration components linked by the edge into at least part of the first reply-configuration specification, wherein:
the pair of configuration components linked by the edge pertain to first service-provider computer system,
the pair of configuration components linked by the edge are among the at least some of the first plurality of configuration components,
at least some of the first plurality of configuration components pertain to service providers among the plurality of different service providers other than the first service provider, and the first reply-configuration specification specifies at least part of a message to communicate an authentication determination to the first service-provider computer system;

determining, with the identity-provider computer system, whether to provide authentication;

forming, with the identity-provider computer system, based on the first reply-configuration specification, a reply to the request, the reply including a result of the authentication determination; and sending, with the identity-provider computer system, the reply to the first service-provider computer system or to the user computing device.

2. The medium of claim 1, comprising:

receiving, from a second service-provider computer system, a request for authentication of another user computing device;

accessing the graph of configuration components to obtain a second plurality of configuration components, wherein:
the second plurality of configuration components contains at least one configuration component that is not in the first plurality of configuration components;
the second plurality of configuration components contains at least one configuration component that is in the first plurality of configuration components;

forming, from the second plurality of configuration components, a second reply-configuration specification different from the first reply-configuration specification; and sending a reply to the second service-provider computer system based on the second reply-configuration specification.

3. The medium of claim 1, wherein:
the configuration components in the graph are each a respective document formatted in a hierarchical serialization format; and
edges of the graph are denoted in the documents by text referencing another of the documents and indicating a relationship to the referenced document, wherein the combining is based on a type of relationship among a plurality of types of relationships in the graph, with different types corresponding to different ways of combining the documents.

4. The medium of claim 1, wherein:
forming the first reply-configuration specification comprises:
parsing a first configuration component to identify a reference to a second configuration component, the reference denoting the edge, the first and second configuration component being the pair of configuration components linked by the edge.

5. The medium of claim 4, wherein:
the relationship specifies that the first configuration component inherits from the second configuration component; and
combining comprises adding a configuration setting from the first configuration component to a plurality of configuration settings in the second configuration component.

6. The medium of claim 4, wherein:
the relationship specifies that the first configuration component overrides the second configuration component; and
combining comprises replacing a configuration setting in the second configuration component with a configuration setting in the first configuration component.

7. The medium of claim 1, wherein:
the graph is a directed acyclic graph; and
forming the first reply-configuration specification comprises:
recursively traversing the directed acyclic graph in a depth first traversal to form the first reply-configuration specification from three or more configuration components forming three respective nodes on the path in the graph, the recursion beginning with a configuration component uniquely associated with the first service provider among the plurality of different service providers.

8. The medium of claim 1, wherein:
the graph of configuration components comprises a polymorphic arrangement of configuration components in which a base configuration specification is invoked by a plurality of other configuration components to apply configuration settings in the base configuration component in combination with the other configuration components.

9. The medium of claim 8, wherein:
the polymorphic arrangement is ad hoc polymorphism.

10. The medium of claim 8, wherein:
the polymorphic arrangement is parametric polymorphism.

11. The medium of claim 1, wherein:
the first reply-configuration specification is formed before receiving the request for authentication; and
the operations comprise:
after receiving the request for authentication, determining that each configuration component used to form the first reply-configuration specification has not expired.

12. The medium of claim 1, wherein the first reply-configuration specification comprises:
cryptographic signature requirements of the first service-provider computer system for authentication messages;
application or transport layer protocol bindings supported by the first service-provider computer system for authentication messages; and
attributes required by the first service-provider computer system for authentication messages.

13. The medium of claim 12, wherein:
the reply includes authentication of a user based on credentials supplied via the user computing device;
determining to provide authentication comprises comparing the credentials to stored user credentials associated with a user account;
the graph of configuration components includes a plurality of documents each having different subsets of configuration settings of Security Assertion Markup Language configurations corresponding to five or more different service-provider computer systems;
sending the reply comprises sending an extensible markup language document satisfying the cryptographic signature requirements via at least some of the protocols among the supported bindings with at least some of the required attributes, wherein the reply includes more than 20 configuration settings.

14. The medium of claim 1, wherein:
forming the first reply-configuration specification comprises steps for instantiating a reply-configuration specification;
sending the reply comprises steps for indicating authentication to the first service-provider computer system; and the graph is arranged according to means for specifying a call graph.

15. The medium of claim 1, wherein:
the first reply-configuration specification specifies how to format, for the first service provider, a cryptographically signed Security Assertion Markup Language response having an encrypted cryptographically signed assertion identifier, the format being different from that of at least some of the other service providers.

16. A method, comprising:
receiving, from a first service-provider computer system or from a user computing device, via a network, with an identity-provider computer system, a request to authenticate a user computing device, wherein:
the request specifies a first service provider among a plurality of different service providers on a plurality of different domains for which the identity-provider computer system is configured to make authentication determinations;
forming, with the identity-provider computer system, a first reply-configuration specification from a first plurality of configuration components, wherein forming comprises:
accessing a graph of configuration components, the graph defining reply-configuration specifications for the plurality of different service providers, the first plurality of configuration components corresponding to a subset of the graph,
determining that at least some of the first plurality of configuration components pertain to the first service-provider computer system based on a path in the graph along edges of the graph, and
evaluating a relationship defined by an edge of the graph to determine, at least in part, how to combine a pair of configuration components linked by the edge into at least part of the first reply-configuration specification, wherein:
the pair of configuration components linked by the edge pertain to first service-provider computer system,
the pair of configuration components linked by the edge are among the at least some of the first plurality of configuration components,
at least some of the first plurality of configuration components pertain to service providers among the plurality of different service providers other than the first service provider, and
the first reply-configuration specification specifies at least part of a message to communicate an authentication determination to the first service-provider computer system;
determining, with the identity-provider computer system, whether to provide authentication;
forming, with the identity-provider computer system, based on the first reply-configuration specification, a reply to the request, the reply including a result of the authentication determination; and
sending, with the identity-provider computer system, the reply to the first service-provider computer system or to the user computing device.

17. The method of claim 16, wherein:
forming the first reply-configuration specification comprises:
parsing a first configuration component to identify a reference to a second configuration component, the reference denoting the edge, the first and second configuration component being the pair of configuration components linked by the edge.

18. The method of claim 17, wherein:
the relationship specifies that the first configuration component inherits from the second configuration component; and
combining comprises adding a configuration setting from the first configuration component to a plurality of configuration settings in the second configuration component.

19. The method of claim 17, wherein:
the relationship specifies that the first configuration component overrides the second configuration component; and
combining comprises replacing a configuration setting in the second configuration component with a configuration setting in the first configuration component.

20. The method of claim 16, wherein:
the graph is a directed acyclic graph; and
forming the first reply-configuration specification comprises:
recursively traversing the directed acyclic graph in a depth first traversal to form the first reply-configuration specification from three or more configuration components forming three respective nodes on the path in the graph, the recursion beginning with a configuration component uniquely associated with the first service provider among the plurality of different service providers.

* * * * *